United States Patent Office 3,047,722
Patented July 31, 1962

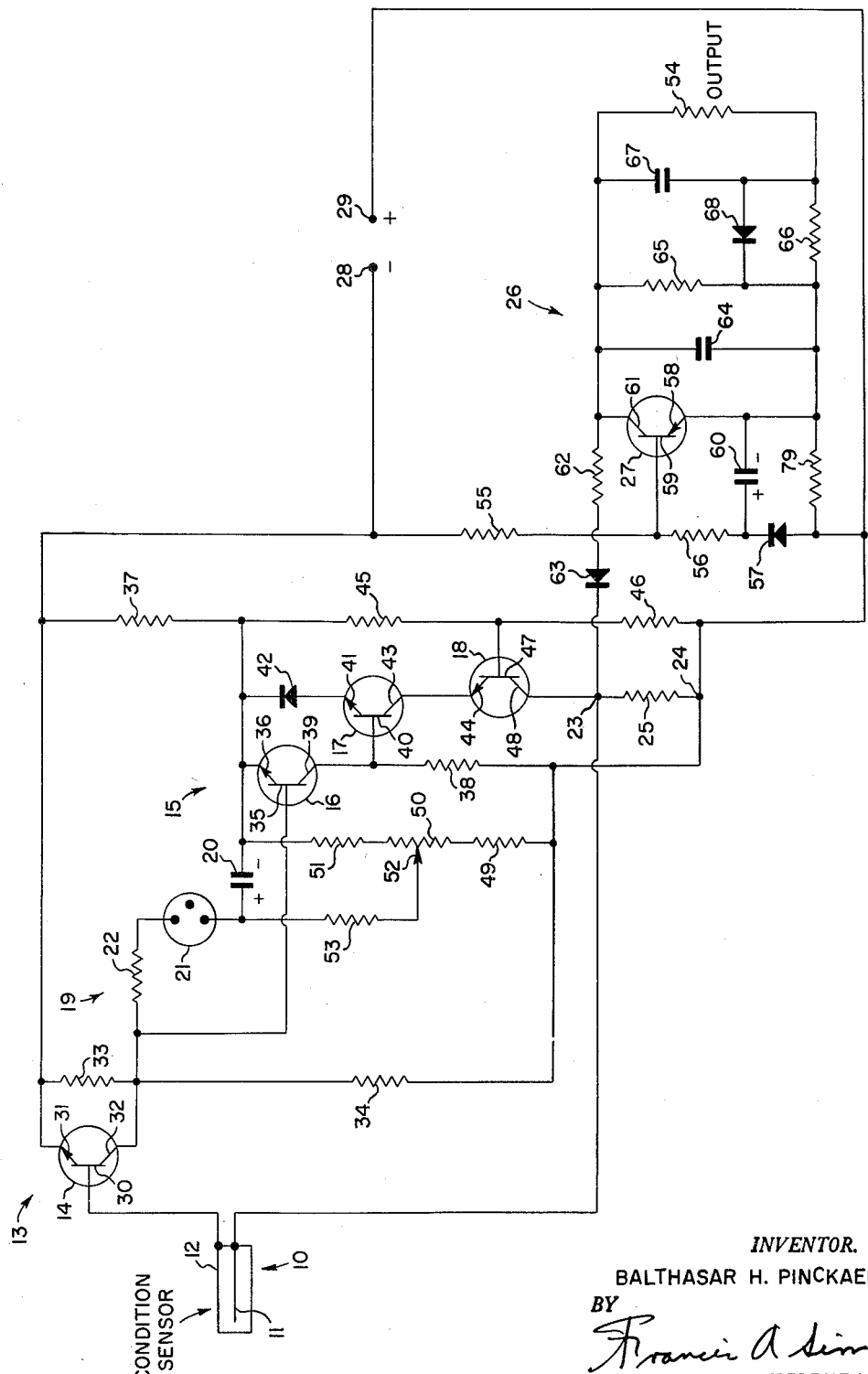

3,047,722
ELECTRIC APPARATUS
Balthasar H. Pinckaers, Edina, Minn., assignor to Minneapolis-Honeywell Regulator Company, Minneapolis, Minn., a corporation of Delaware
Filed Aug. 24, 1959, Ser. No. 835,613
6 Claims. (Cl. 250—83.6)

The present invention is concerned with an improved electric apparatus and particularly an electric apparatus utilizing a nonselfquenching condition sensor of the type having electrodes disposed in an ionizable gaseous medium. When this type of condition sensor is subjected to a condition to which it is sensitive, the gas within the condition sensor is ionized and current flows between the electrodes thereof. This current flow is sustained until such time as the voltage applied to the electrodes of the condition sensor is reduced to a level at which the condition sensor is deionized or quenched. The apparatus of the present invention provides an improved means of controlling the operating voltage for this type of a condition sensor.

The specific condition sensor disclosed in the present application is a Geiger tube type of device which is one of the devices which falls within the generic term of a condition sensor having a pair of electrodes disposed in an ionizable gaseous medium. With this type of a condition sensor, the condition sensor is ionized both due to the presence of a condition to which it is sensitive and due to inherent background effects which cause ionization of the condition sensor. The distinguishing feature between these two conditions is that the ionization of the condition sensor due to inherent background conditions is of a random and infrequent interval whereas the ionization produced by the condition to which the condition sensor is sensitive is of a regular and frequent interval.

The apparatus of the present invention provides an improved means of controlling the operating voltage for a condition sensor, which apparatus includes a bistable circuit which is connected to be controlled by the condition sensor and has an output connected to control the operating voltage applied to the condition sensor. In this manner, the condition sensor is effective to cause the bistable circuit to move from one stable condition of operation to another, in which other stable condition of operation the bistable circuit is effective to reduce the operating voltage applied to the condition sensor and thereby quench or cause deionization of the condition sensor, to render the condition sensor nonconductive. Furthermore, the apparatus of the present invention provides a timing means which is connected in controlling relation to the bistable circuit and is effective to cause the bistable circuit to again revert to the stable state of operation in which an operating voltage is applied to the condition sensor.

In the event that the condition sensor is subjected to a condition to which it is sensitive, the condition sensor cycles between two states of operation and means is provided to respond only to a continuous cycling between these two states of operation. Specifically, this last named means consists of an integrating circuit. In this manner, the apparatus of the present invention distinguishes between the background ionizing events and the ionizing caused by a condition to which the condition sensor is sensitive.

Furthermore, the present invention provides means whereby the timing period of the above mentioned timing means can be varied to control the cycling rate of the bistable circuit as well as the condition sensor. In this manner, the condition sensor may be adjusted to count at a saturated rate for each particular application to which the condition sensor is put. In other words, the timing of the timing circuit may be so adjusted that substantially immediately upon an operating voltage again being applied to the condition sensor, the condition sensor is again rendered conductive to thereby cause the bistable circuit to revert to the above mentioned other state of operation. In this manner, the sensitivity of the apparatus may be adjusted to a maximum value for each installation.

The present invention will be apparent to those skilled in the art upon reference to the following specification, claims, and drawings, of which the single FIGURE is a schematic representation of the preferred embodiment of the present invention.

Referring to the single figure, the reference numeral 10 designates a condition sensor having a pair of electrodes 11 and 12 disposed in an ionizable gaseous medium. Specifically, the condition sensor 10 consists of a Geiger tube having an anode 11 and a cathode 12. However, it will be recognized that it is within the teachings of the present invention to provide a condition sensor which, while being of the type having a pair of electrodes disposed in an ionizable gaseous medium, is not strictly speaking a Geiger tube.

The Geiger tube 10 is connected in controlling relation to a first stage of amplification identified generally by means of the reference numeral 13. This stage of amplification 13 includes a normally nonconductive transistor 14.

The reference numeral 15 designates a bistable electronic circuit or network having transistors 16, 17, and 18. The bistable circuit 15 has a first stable state of operation in which transistor 16 is conductive and transistors 17 and 18 are nonconductive. The second stable state of operation of network 15 consists of a state in which transistor 16 is nonconductive and transistors 17 and 18 are conductive.

The reference numeral 19 identifies a timer in the form of a free-running relaxation oscillator circuit including capacitor 20, a gaseous discharge device in the form of a neon tube 21, and a resistor 22. This timing circuit 19 is connected in controlling relation to the bistable circuit 15 and periodically provides a pulse of electrical energy to the bistable circuit, and specifically to transistor 16, which tends to maintain this bistable circuit in its first stable condition with transistor 16 conductive. As will be explained, the input of the bistable circuit 15 is connected to be controlled by condition sensor 10, through the medium of transistor 14, such that the bistable circuit is pulsed or triggered to its second stable state of operation upon condition sensor 10 becoming conductive, either due to a background ionizing event or due to an ionizing event caused by a condition to which the condition sensor is sensitive, for example, the presence of fire in the area in which the condition sensor is disposed.

The output of bistable circuit 15 can be considered as terminals 23 and 24 to which the resistor 25 is connected. The resistor 25 is connected also to the input of an integrating network designated generally by means of the reference numeral 26. The integrating network 26 includes a transistor 27 to provide more adequate discrimination against the random and infrequent background ionization of the condition sensor 10, as will be explained.

Describing the apparatus of the present invention more fully, the reference numerals 28 and 29 identify power input terminals to which a source of operating voltage, not shown, is adapted to be connected. This source of operating voltage is a D.C. type voltage which is connected so as to render terminal 29 positive and terminal 28 negative. This source of operating voltage is connected to the electrodes of the condition sensor 10 through a circuit which can be traced from terminal 29 through resistor 25, condition sensor 10, and the base electrode 30 and the emitter electrode 31 of transistor 14 to the negative terminal 28 of the power supply.

The output circuit of transistor 14, that is its emitter 31 and a collector 32, is connected in shunt with a resistor 33 which in combination with a further resistor 34 forms a voltage divider network across the terminals 28 and 29. The voltage developed across resistor 33 provides operating voltage for transistor 14. This voltage is a relatively low voltage and resistor 33 is very small compared to resistor 34. For example, in a particular construction of the present invention, resistor 33 has a value of 33,000 ohms while resistor 34 has a value of 1.8 megohms.

The collector electrode 32 of transistor 14 is directly connected to the base electrode 35 of transistor 16. The emitter electrode 36 of this transistor is connected through a resistor 37 to the emitter electrode 31 of transistor 14. By means of this circuit connection, so long as transistor 14 is nonconductive, the voltage developed across resistor 33 in the voltage divider 33—34 is connected to the input 35—36 of transistor 16 and maintains transistor 16 conductive. The conduction circuit for transistor 16 includes resistor 37, emitter 36 and collector 39 and resistor 38. Collector electrode 39 is directly connected to the base electrode 40 of transistor 17 and emitter electrode 41 of transistor 17 is connected through a diode 42 to the emitter electrode 36 of transistor 16. When transistor 16 is in a conducting condition, the collector to emitter voltage drop of this transistor is relatively low and is of an insufficient magnitude to overcome the forward voltage drop of diode 42 to cause a base to emitter current to flow in transistor 17. Therefore, transistor 17 remains nonconductive.

The collector electrode 43 of transistor 17 is connected to the emitter electrode 44 of transistor 18 and therefore so long as a collector to emitter current does not flow in transistor 17, a base to emitter current cannot flow for transistor 18 and transistor 18 remains cut off.

Operating voltage for transistor 17 and 18 is derived from a voltage divider which includes the above mentioned resistor 37 connected in series with a resistor 45 and a resistor 46 to terminals 28 and 29. The base electrode 47 of transistor 18 is connected to the junction of resistors 45 and 46 while the collector 48 of this transistor is connected through resistor 25 to the positive terminal 29.

The current flow path for the cascade connected transistors 17 and 18 can be traced from the positive terminal 29 through resistor 25, the collector to emitter circuit of transistor 18, the collector to emitter circuit of transistor 17, diode 42, and resistor 37 to the negative terminal 28. Transistors 17 and 18 are placed in a conductive state when transistor 16 is rendered nonconductive, as above described. With transistors 17 and 18 conductive, the voltage drop existing from the collector electrode 48 to the emitter electrode 41 is relatively low. Furthermore, resistor 37 has a low value when compared to that of resistor 25. As an example, resistor 37 may be 2200 ohms while resistor 35 is 150,000 ohms. Therefore, substantially all of the voltage existing between terminals 28 and 29 is now dropped across resistor 25. It will be remembered that resistor 25 lies in the series circuit which supplies operating voltage to the electrodes of condition sensor 10 and therefore with transistors 17 and 18 conductive, the voltage applied to the electrodes 11 and 12 of the condition sensor is appreciably reduced and is in fact reduced to below the extinction potential of the ionizable gas of the condition sensor. Therefore, the action of transistors 17 and 18, when rendered conductive, acts to quench or deionize the condition sensor 10 to render it nonconductive.

Furthermore, so long as transistors 17 and 18 remain conductive, the voltage applied to the electrodes of the condition sensor 10 is at a low value and the condition sensor is not operative to sense the condition to which it is sensitive.

This bistable circuit 15 is maintained in its second stable condition wherein transistor 16 is nonconductive and transistors 17 and 18 are conductive for a time period which is determined by timer 19. As above mentioned, this timer takes the form of a free-running relaxation oscillator and includes a capacitor 20 which may be charged from a circuit including terminal 29, resistor 49, potentiometer 50, resistor 51, and resistor 37 to the negative terminal 28. The movable tap 52 of potentiometer 50 is connected through resistor 53 to capacitor 20 and therefore capacitor 20 is charged in accordance with the voltage established across resistor 51 and across the upper portion of the potentiometer 50. The timing function achieved by means of the relaxation oscillator is controlled by movement of the potentiometer tap 52. As the potentiometer tap is moved in an upward direction, the voltage applied to the series connected capacitor 20 and resistor 53 is reduced and therefore the timing period achieved by the relaxation oscillator is increased. It follows therefore that movement of the potentiometer tap 52 in a downward direction decreases the timing function achieved. As capacitor 20 charges, the voltage applied to a circuit including neon tube 21, resistor 22, and the base emitter circuit of transistor 16 gradually increases until a point is reached where the neon tube 21 fires. When this tube fires, capacitor 20 is discharged through a circuit which can be traced from the left hand plate of this capacitor through neon tube 21, resistor 22, and the base to emitter circuit of transistor 16 to the right hand plate of capacitor 20. This discharge current provides a forward biasing pulse for transistor 16 and acts to control or switch the bistable circuit 15 from its second stable condition to its first stable condition wherein transistor 16 is again conductive and transistors 17 and 18 are nonconductive.

Since this relaxation oscillator is a free-running oscillator, the forward biasing pulse is applied to transistor 16 at a regular frequency or interval. Condition sensor 10 may receive an ionizing event at any time and is effective when this happens to place bistable circuit 15 in its second stable condition. If this ionizing event is a random event, timer 19 returns bistable circuit 15 to its first stable condition and circuit 15 remains in this condition. In the event that condition sensor 10 is subjected to a condition to which it is sensitive, then bistable circuit 15 returns to its first stable condition and is immediately returned to its second stable condition by a further ionizing event. In this manner, the counting of condition sensor 10, and the cycling of circuit 15 between its two stable states, falls into step with the cycling of oscillator 19.

When transistors 17 and 18 are rendered nonconductive, the above described voltage which is produced across resistor 25 due to the conduction of these transistors no longer exists and therefore substantially the full voltage existing between terminals 28 and 29 is now applied to the electrodes of the condition sensor 10, thereby rendering this condition sensor once again operative.

Thus far, the above explanation has described the manner in which condition sensor 10, upon being rendered conductive, controls transistor 14 to render this transistor conductive, transistor 16 nonconductive, and transistors 17 and 18 conductive, the conduction circuit of these last mentioned transistors including impedance 25 across which substantially the full operating voltage derived from source 28—29 is dropped so that the condition sensor 10 is rendered inoperative. The timer 19 is then effective after a given time period to apply an input signal pulse to the bistable circuit 15 to cause this bistable circuit to return to its first stable condition and thereby again apply operating voltage to the condition sensor 10.

As has been pointed out, the assumed ionizing event which initially caused conduction of condition sensor 10 may be due either to an inherent background ionizing event or may be the first of a series of ionizing events which are received due to the establishment of a condition to which the condition sensor 10 is sensitive, for example, the establishment of flame in the area supervised or monitored by the condition sensor 10. In the event that only random and infrequent background ionizing events are being detected, the integrating network 26 is effective to discriminate against such a random ionization rate of the condition sensor 10. However, in the event that a flame or fire is detected, then the integrating means 26 allows a signal to pass to energize a load which, for simplicity, has been shown as a resistor identified by the reference numeral 54 and labeled "output."

Considering the operation of the integrating means 26 in greater detail, this integrating network includes a transistor 27 which receives its operating voltage from a voltage divider including resistors 55 and 56 connected in series with a diode 57.

Transistor 27 is biased in a forward direction by means of a biasing circuit which can be traced from terminal 29 through resistor 79 in parallel with diode 57 and capacitor 60, the emitter to base circuit of transistor 27, and resistor 55 to the negative terminal 28.

Capacitor 64 is connected to emitter 58 and collector 61 and is also connected to resistor 25. Capacitor 64 is adapted to be charged by an input signal circuit which can be traced from terminal 24 through resistor 79, capacitor 64, resistor 62, and diode 63 to terminal 23. When transistors 17 and 18 are in a conducting condition, terminal 24 is positive with respect to terminal 23 and therefore the lower plate of capacitor 64 is charged positive with respect to the upper plate. This lower plate of capacitor 64 is connected to the emitter electrode 58 of transistor 27 while the negative plate of the capacitor is connected into the collector electrode 61. Therefore, when transistor 27 is rendered conductive, the emitter to collector circuit of this transistor is effective to discharge capacitor 64.

Capacitor 64 is connected to a further circuit including resistor 65, resistor 66 and capacitor 67. This further circuit is arranged such that as capacitor 64 is charged, this charge is distributed through resistor 66 to charge capacitor 67. A diode 68 is provided in shunt with resistor 66 and is effective to provide a circuit to substantially immediately discharge capacitor 67 in the event that transistor 27 is rendered conductive.

The operation of integrating means 26 can be seen by considering a series of cycles of operation. It will be remembered that transistor 27 is biased in a forward direction. Therefore, the emitter to collector impedance of this transistor is relatively low.

Assume now that the condition sensor 10 is subjected to a condition to which it is sensitive, a cyclic D.C. voltage is developed across resistor 25, as above described, such that the terminal 24 is rendered positive with respect to terminal 23. This voltage is essentially a square wave voltage and has a long on time. For example, in one embodiment, the voltage across resistor 25 appeared for a time duration of 30 milliseconds and was then off for a period of 2 milliseconds, in a cyclic manner, so long as condition sensor 10 was subjected to a condition to which it is sensitive. During each on time, a current flows from terminal 24 through resistor 79, transistor 27, resistor 62, and diode 63 to the terminal 23. The voltage developed across resistor 79 is of a relatively high magnitude and of such a polarity that the left hand terminal of this resistor is positive with respect to the right hand terminal. The effect of this voltage is to charge capacitor 60 to a higher voltage than already across it.

As circuit 15 continues to cycle between its two stable conditions, a cyclic voltage is developed across resistor 25. As a result of this voltage, a cyclic current flows through the above traced circuit including resistor 79 and the voltage thus developed across resistor 79 causes capacitor 60 to gradually charge to a higher and higher voltage. This gradually increasing voltage is applied to the base and emitter electrodes of transistor 27 as a reverse biasing voltage which causes transistor 27 to become less and less conductive. In other words, the emitter to collector impedance of transistor 27 gradually increases.

As transistor 27 is rendered less conductive, capacitor 64 begins to charge and continues to charge at an increasing rate until a point is reached, after a given number of regulator counts by sensor 10, where transistor 27 is substantially nonconductive. With transistor 27 now nonconductive, a current flow circuit can be traced from the lower terminal of resistor 25 through resistor 79, capacitor 64, resistor 62 and diode 63 to the upper terminal of resistor 25. As a result, a capacitor 64 is charged. However, it should be remembered that this charging takes place only if the condition sensor is subjected to an actual condition to which it is sensitive, whereby transistor 27 is gradually rendered nonconductive.

In the event that the voltage pulses produced across resistor 25 are due to inherent background counts produced at the condition sensor 10, then these pulses of voltage will be either of an irregular interval or, if of a regular interval, will be chains of pulses broken here and there by periods during which no voltage occurs across resistor 25. During these periods, capacitor 60, which may in fact be charged somewhat by the previous pulses of voltage across resistor 25, quickly discharges both through the base to emitter circuit of transistor 27 and through diode 57 and resistor 79, this discharge taking place by means of a super position of the discharging current upon the biasing current already flowing in the circuits. As a result thereof, capacitor 60 is not appreciably charged by means of the background count of the condition sensor 10 and transistor 27 is maintained substantially nonconductive to prevent appreciable charging of capacitor 64.

As explained above, however, upon condition sensor 10 being subjected to an actual condition to which it is sensitive, capacitor 64 does receive a full charge and this voltage is distributed through a resistor 66 to charge capacitor 67. With capacitor 67 charged, the load or output 54 is energized to indicate the presence of the condition to which sensor 10 is sensitive.

From the above description, it can be seen that I have provided an improved electric apparatus for use with a condition sensor of the type having a pair of electrodes disposed in an ionizable gaseous medium and in which the bistable network 15 is effective to control the operating voltage applied to the condition sensor 10. Furthermore, a timing means in the form of a free-running relaxation oscillator 19 is provided to control the bistable network 15 and thereby cause the condition sensor 10 to become ionized at the saturation rate as determined by the setting of the potentiometer wiper 52. Furthermore, an integrating means 26 is provided which is responsive only to sustained and frequent pulse of voltage across the output of the bistable network 15, namely resistor 25.

Other modifications of the present invention will become apparent to those skilled in the art and it is therefore intended that the scope of the present invention be limited solely by the scope of the appended claims.

I claim as my invention:

1. Electric apparatus, comprising, a nonselfquenching condition sensor of the type having a pair of electrodes disposed in an ionizable gaseous medium, impedance means, a source of operating voltage, circuit means connecting said condition sensor, said impedance means and said source of voltage in circuit to provide an operating voltage for said condition sensor, said condition sensor being effective upon being subjected to a condition to which it is sensitive to become conductive and to remain conductive until the voltage applied thereto is reduced at least to the extinction potential of the condition sensor;

a bistable circuit having an input connected to said condition sensor to be controlled thereby and having an output connected to said impedance means, said bistable circuit being effective when said condition sensor becomes conductive to assume a stable state of operation in which a voltage is developed across said impedance means in opposition to said source of operating voltage to thereby cause said condition sensor to become nonconductive; and timing means connected to control said bistable circuit and to cause said bistable circuit to assume a further stable state of operation in which said voltage is no longer developed across said impedance means and said condition sensor is again rendered operative.

2. Electric apparatus comprising; a nonselfquenching condition sensor of the type having a pair of electrodes disposed in an ionizable gaseous medium, said condition sensor being effective upon being subjected to a condition to which it is sensitive to become ionized and conductive so that current passes through the gaseous medium, impedance means, a source of operating voltage, circuit means connecting said condition sensor, said impedance means and said source of voltage in circuit to apply an operating voltage to said condition sensor; a bistable electronic circuit having an input connected to be controlled by said condition sensor and having an output connected to said impedance means, said bistable circuit normally being maintained in a first stable condition wherein no output voltage exists across said impedance means and being effective upon said condition sensor being rendered conductive to assume a second stable condition of operation wherein an output voltage is developed across said impedance means in opposition to said source of operating voltage to thereby render said condition sensor inoperative to further sense the condition; and timing means connected to said bistable circuit and effective after a time period to cause said bistable circuit to again assume said first stable state of operation wherein an output voltage is not developed across said impedance means and said condition sensor is thereby again rendered operative.

3. Electric apparatus comprising; a nonselfquenching condition sensor of the Geiger tube type having a pair of electrodes disposed in an ionizable gaseous medium and effective upon being subjected to an ionizing condition to become conductive such that current flows between the electrodes thereof, said condition sensor remaining conductive until the operating voltage applied to the electrodes thereof is reduced to at least the extinction potential of the condition sensor; a source of operating voltage, circuit means connecting said condition sensor and said source of operating voltage in circuit to provide an operating voltage for said condition sensor; a bistable circuit having an input and an output and having a first stable condition of operation in which an output voltage does not appear at the output thereof and having a second stable state of operation in which an output voltage appears at the output thereof, circuit means connecting the input of said bistable circuit to said condition sensor to be controlled thereby and to assume said second stable state of operation upon said condition sensor becoming conductive, circuit means connecting the output of said bistable circuit in circuit with said condition sensor to reduce the voltage applied to said condition sensor to at least said extinction potential upon said bistable circuit assuming said second stable state of operation; and timing means connected in controlling relation to said bistable circuit and effective to cause said bistable circuit to assume said first stable state of operation and thereby again render said condition sensor operative.

4. Electric apparatus comprising; a nonselfquenching condition sensor of the type having a pair of electrodes disposed in an ionizable gaseous medium, said condition sensor being effective upon an operating voltage being applied to the electrodes thereof and upon being subjected to a condition to which it is sensitive to become conductive such that electrical current passes between the electrodes thereof; a source of operating voltage, circuit means connecting said condition sensor and said source of operating voltage in circuit to provide an operating voltage for said condition sensor; a bistable circuit having an input and an output and having a first stable state of operation in which no output voltage appears at the output thereof and a second stable state of operation in which an output voltage appears at the output thereof; free-running relaxation oscillator timing means connected in controlling relation to said bistable circuit and providing a periodic control signal to said bistable circuit such that said bistable circuit is normally maintained in said first stable state of operation; circuit means connecting the input of said bistable circuit to be controlled by said condition sensor in such a manner as to cause said bistable circuit to assume said second stable state of operation upon said condition sensor becoming conductive, circuit means connecting the output of said bistable circuit in circuit with said condition sensor to oppose said source of operating voltage and thereby remove the operating voltage from said condition sensor upon said bistable circuit assuming said second stable state of operation, said timing means thereafter being effective to restore said bistable circuit to said first stable state of operation.

5. Electric apparatus comprising; a nonselfquenching condition sensor of the type having a pair of electrodes disposed in an ionizable gaseous medium and effective upon being subjected to an ionizing condition to become conductive and to remain conductive until such time as operating voltage is removed from the electrodes; a source of operating voltage therefor, circuit means connecting said source of operating voltage to the electrodes of said condition sensor; a bistable electronic network having an input connected to be controlled by said condition sensor and having an output connected in circuit with said condition sensor, said bistable circuit having a first stable condition of operation in which no output voltage appears at the output thereof, and having a second stable condition of operation in which an output voltage appears at the output thereof and is effective to oppose said source of operating voltage to thereby reduce the voltage applied to the electrodes of said condition sensor to below the operating voltage of said condition sensor; and variable timing means connected in controlling relation to said bistable circuit and being effective to restore said bistable circuit to said first stable condition of operation, said timing means being variable to accommodate adjustment of the apparatus such that said condition sensor cycles between conducting and nonconducting conditions at a saturated rate; and further means responsive only to continuous cycling of said bistable circuit between said first and second stable conditions of operation.

6. Electric apparatus comprising; a nonselfquenching condition sensor of the type having a pair of electrodes disposed in an ionizable gaseous medium, a source of operating voltage, circuit means connecting said condition sensor and said source of operating voltage in circuit to provide an operating voltage for said condition sensor, said condition sensor being effective upon being subjected to a condition to which it is sensitive to become conductive and to remain conductive until the operating voltage applied thereto is reduced to at least the extinction potential of the condition sensor; a bistable circuit having a transistor, biasing means for said transistor to maintain said transistor normally conductive to establish a first stable state of operation, circuit means including means connected in circuit with said condition sensor and controlled by said transistor, said circuit means being effective upon said transistor being in a nonconducting state to cause the voltage applied to the condition sensor to be reduced to below the operating voltage for the condition sensor, further circuit means connecting said condition sensor in controlling relation to said transistor to render said transistor nonconductive to establish a second stable state of operation and to thereby render said condition sensor inoperative, free-running timing means connected in controlling relation to said transistor and effective to periodically provide a pulse of electrical current as a forward bias to said transistor, said timing means functioning to subsequently return said transistor to said stable conducting state; and further means connected to be controlled by said transistor and responsive to only a continuous cycling of said transistor between said conducting and nonconducting states.

References Cited in the file of this patent

UNITED STATES PATENTS

| | | |
|---|---|---|
| 2,708,721 | Ziffer | May 17, 1955 |
| 2,721,276 | Exner | Oct. 18, 1955 |
| 2,838,680 | Bender et al. | June 10, 1958 |
| 2,948,812 | Quinn | Aug. 9, 1960 |